US011936109B2

(12) United States Patent
Deforge

(10) Patent No.: US 11,936,109 B2
(45) Date of Patent: Mar. 19, 2024

(54) mmWAVE DIELECTRIC WAVEGUIDE BEAM FORMER/REDIRECTOR

(71) Applicant: TELEFONAKTIEBOLAGET LM ERICSSON (PUBL), Stockholm (SE)

(72) Inventor: John Bradley Deforge, Chelsea (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/786,076

(22) PCT Filed: Aug. 24, 2020

(86) PCT No.: PCT/IB2020/057907
§ 371 (c)(1),
(2) Date: Jun. 16, 2022

(87) PCT Pub. No.: WO2021/144626
PCT Pub. Date: Jul. 22, 2021

(65) Prior Publication Data

US 2023/0028637 A1 Jan. 26, 2023

Related U.S. Application Data

(60) Provisional application No. 62/962,270, filed on Jan. 17, 2020.

(51) Int. Cl.

| | |
|---|---|
| ***H01Q 19/17*** | (2006.01) |
| ***H01Q 3/24*** | (2006.01) |
| ***H01Q 15/08*** | (2006.01) |
| ***H01Q 15/23*** | (2006.01) |

(52) U.S. Cl.
CPC ............... *H01Q 19/17* (2013.01); *H01Q 3/24* (2013.01); *H01Q 15/08* (2013.01); *H01Q 15/23* (2013.01)

(58) Field of Classification Search
CPC .. H01Q 3/24; H01Q 3/28; H01Q 3/30; H01Q 15/08; H01Q 15/23; H01Q 19/06; H01Q 19/17
See application file for complete search history.

(56) References Cited

U.S. PATENT DOCUMENTS

2015/0325922 A1 11/2015 Fujita et al.

FOREIGN PATENT DOCUMENTS

EP 02129632 3/2007

OTHER PUBLICATIONS

Nima Bayat-Makou et al.; Single-Layer Substrate-Integrated Broadside Leaky Long-Slot Array Antennas With Embedded Reflectors for 5G Systems; IEEE Transactions On Antennas and Propagation, vol. 67, No. 12, Dec. 2019.

Yu Jian Cheng et al., Millimeter-Wave Substrate Integrated Waveguide Multibeam Antenna Based On the Parabolic Reflector Principle; IEEE Transactions on antennas and propagation, vol. 56, No. 9, Sep. 2008.

Sipal, Vit, "International Search Report (ISR)", PCT/IB2020/057907, European Patent Office, The Netherlands, Oct. 23, 2020.

*Primary Examiner* — Hoang V Nguyen

(57) ABSTRACT

Embodiments of a dielectric waveguide body comprising an internal reflection surface configured to redirect mmWave radio signals propagating within the waveguide body such that mmWave radio signals emitted by an antenna are redirected to generate a main beam and at least one sidelobe.

16 Claims, 5 Drawing Sheets mmWAVE DIELECTRIC WAVEGUIDE BEAM FORMER/REDIRECTOR

TECHNICAL FIELD

The present disclosure relates to mmWave antenna systems and in particular to a mmWave Dielectric Waveguide Beam Former/Redirector.

BACKGROUND

The use of mmWave signals having frequencies above about 24 GHz has been proposed for 5G radio communications.

mmWave signals can be transmitted/received using planar array antennas, which are a class of antennas that employ more than 2 driven antenna elements. The antenna elements are laid out in an array on a planar substrate such as a printed circuit board (PCB). An RF signal is applied to the antenna elements and can form a beam of RF radiation that is emitted from the surface of the substrate where the antenna is constructed. By adjusting the phase delays and/or amplitude differences between the RF signals driven to each antenna element, a beam can be electronically formed and steered to control its a direction in space relative to the substrate surface. The beam angle extremes to which a planar array antenna can steer a radio beam are referred to limits to steering or viewing angles of the antenna array.

Planar array antennas are commonly designed to steer a beam through an angle of 120° in azimuth (e.g. ±60° from boresight) and 30° in elevation (e.g. ±15° from boresight), but other steering angle limits are possible. In this description, "boresight" refers to the direction orthogonal to the surface of the planar array antenna.

Deployments that require 360° coverage of radio signals are only possible with a multiplicity of planar array antenna units. However, this results in increased size, cost and complexity. A low-cost antenna system that is electronically steerable through 360° coverage is desired.

SUMMARY

An aspect of the present description discloses a dielectric waveguide body comprising an internal reflection surface configured to redirect mmWave radio signals propagating within the waveguide body such that mmWave radio signals emitted by an antenna module are redirected to generate a main beam and at least one sidelobe.

In some embodiments, the dielectric waveguide body may be formed of any one of polytetrafluoroethylene (PTFE), Kapton©, and polyethylene.

In some embodiments, the antenna is a planar array antenna. In some embodiments, steering of the main beam is accomplished by controlling at least one of a radio signal power and a relative signal phase supplied to each antenna module of the planar array antenna.

In some embodiments, the internal reflection surface has a parabolic or quasi-parabolic shape.

In some embodiments, the internal reflection surface comprises a continuous curved shape.

In some embodiments, the internal reflection surface is faceted.

In some embodiments, the internal reflection surface is configured to generate the at least one sidelobe by leakage of radio signal energy through the internal reflection surface.

In some embodiments, the internal reflection surface has a focus, and radio signals emitted by an antenna module located proximal the focus are redirected to generate the main beam. In some embodiments, the focus is located near an upper surface of the dielectric waveguide body. In some embodiments, radio signals emitted by an antenna module located distal the focus are redirected to generate the at least one sidelobe.

A further aspect of the present description provides a radio unit comprising: one or more antenna modules configured to emit or receive mmWave radio signals; and a dielectric waveguide body comprising: an upper surface disposed close to the one or more antenna modules such that the mmWave radio signals emitted or received by the one or more antenna modules pass through the dielectric waveguide body; and an internal reflection surface configured to redirect mmWave radio signals propagating through the dielectric waveguide body to or from the one or more antenna modules to form a main beam and one or more sidelobes.

In some embodiments, each antenna module comprises a pair of antenna elements, each antenna element being configured to emit or receive the mmWave radio signals.

In some embodiments, the one or more antenna modules comprise a plurality of antenna modules of a planar array antenna.

In some embodiments, a first set of antenna modules is positioned proximal a focus of the internal reflection surface, the first set comprising one or more of the plurality of antenna modules. In some embodiments, at least a radio signal power supplied to each antenna module of the first set of antenna modules can be controlled to steer the main beam. In some embodiments, at least a relative radio signal phase supplied to each antenna module of the first set of antenna modules can be controlled to steer the main beam.

In some embodiments, a second set of antenna modules is positioned distal a focus of the internal reflection surface, the second set comprising one or more of the plurality of antenna modules. In some embodiments, at least a radio signal power supplied to each antenna module of the second set of antenna modules can be controlled to steer the one or more sidelobes. In some embodiments, at least a relative radio signal phase supplied to each antenna module of the second set of antenna modules can be controlled to steer the one or more sidelobes.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

Figure 1:
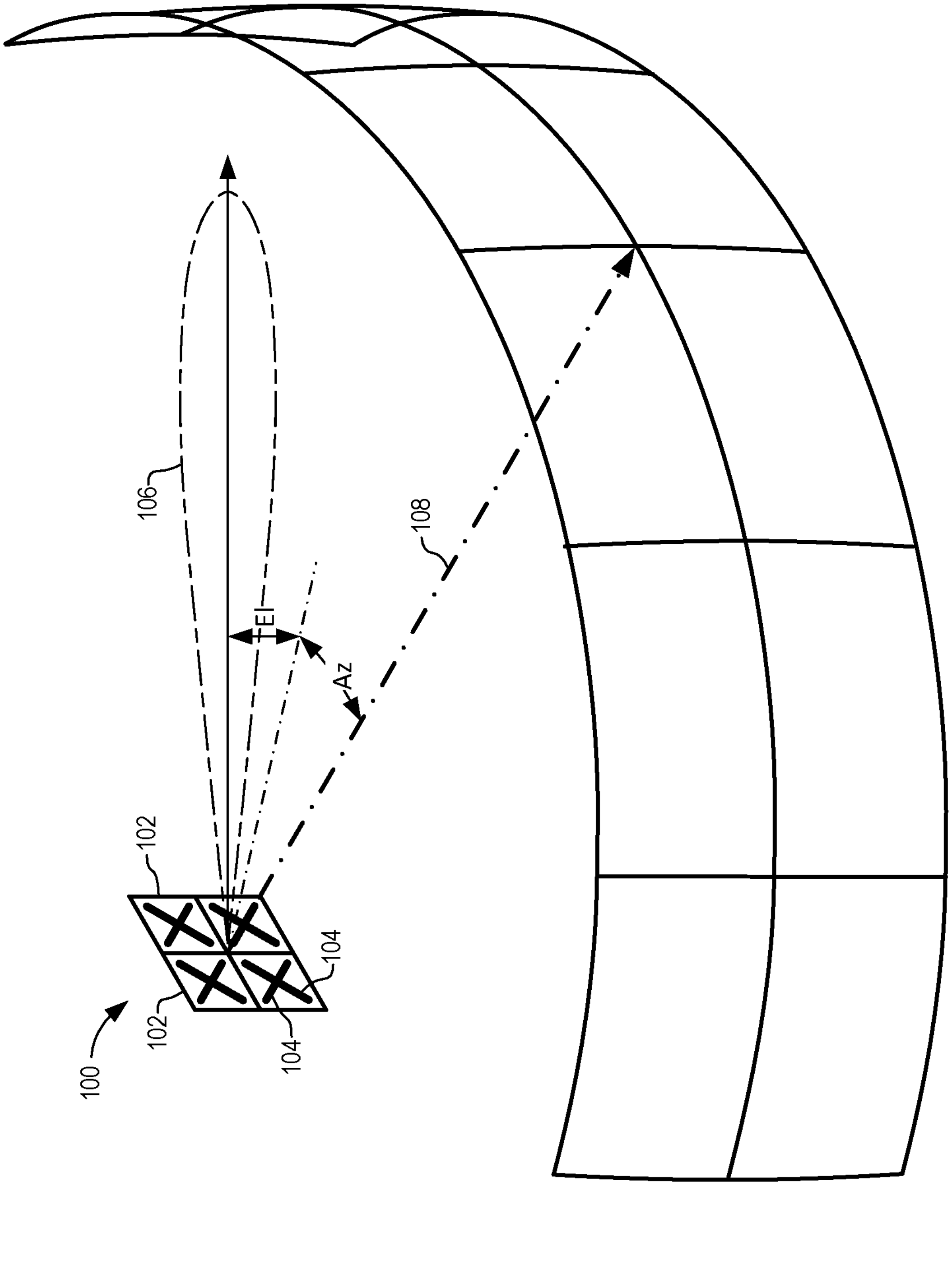
FIG. 1 illustrates radio signal propagation associated with a planar array antenna.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3GPP Third Generation Partnership Project
5G Fifth Generation
AAS Antenna Array System
AoA Angle of Arrival
AoD Angle of Departure
ASIC Application Specific Integrated Circuit
BF Beamforming
BLER Block Error Rate
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

It will be appreciated that an antenna is a bidirectional component and is equally capable of transmitting or receiving radio frequency (RF) signals. For ease of description, embodiments will be described with particular focus on transmitted RF signals. However, it will be appreciated that the embodiments disclosed herein are not limited to transmission of signals, but rather are bidirectional and will work equally well for reception of RF signals.

FIG. 1 illustrates an example planar array antenna (PAA) 100, comprising four antenna modules 102 arranged in a rectangular array. Each antenna module 102 includes a pair of cross-polarized antenna elements 104, such that the illustrated PAA 100 comprises a total of eight antenna elements 104. The antenna elements 104 may be laid out on a planar substrate such as a printed circuit board (PCB), for example. Each antenna element 104 may be driven by a respective radio frequency signal (not shown in FIG. 1) in a known manner. By adjusting the relative phase delays and/or signal amplitude differences between the signals supplied to each antenna element 104, a beam 106 can be electronically formed and steered to control its Azimuth (Az) and elevation (El) in space relative to the boresight 108 of the PAA 100. The beam angle extremes to which a planar array antenna can steer the radio beam 106 are referred to as limits to steering or viewing angles of the antenna array.

Figure 2B:
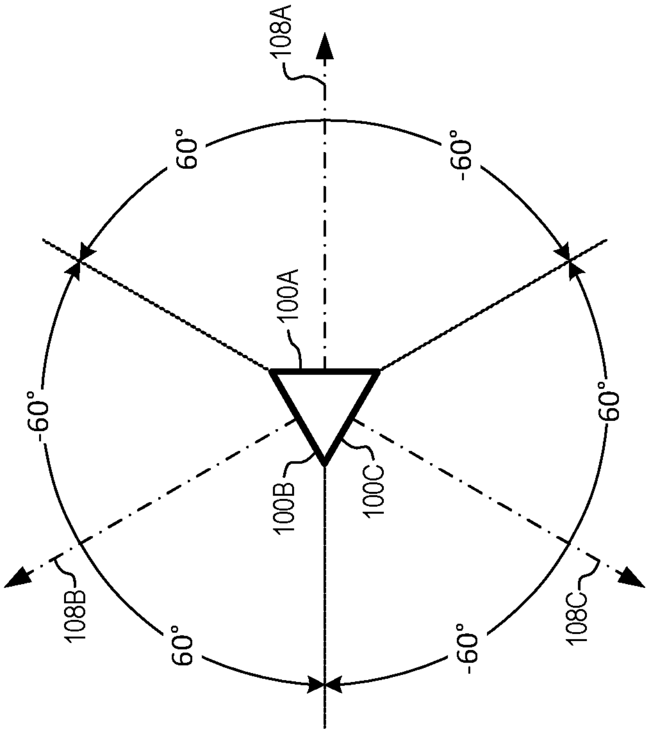
FIGS. 2A and 2B respectively illustrate azimuthal radio signal propagation associated with a planar array antenna and a radio unit including three planar array antennas.
Figure 2A:
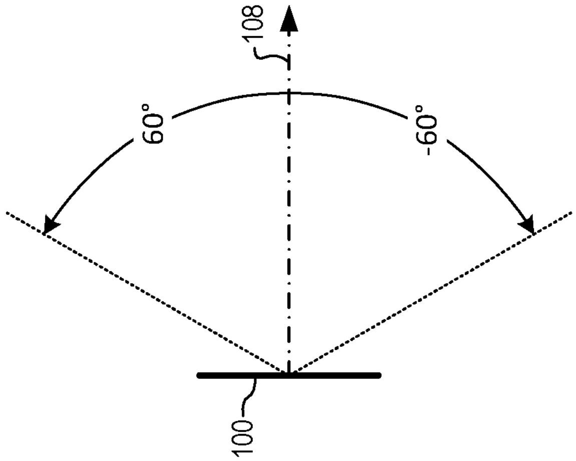

Typically, a PAA 100 is designed to steer a beam 106 through an angle of 120° in azimuth (e.g. ±60° from boresight) and 30° in elevation (e.g. ±15° from boresight), but other angles are possible up to a theoretical limit of ±90° from boresight in both azimuth and elevation directions. FIG. 2A illustrates a 120° beam steering range in the azimuthal plane. As may be seen in FIG. 2B, in order to provide 360° coverage in the azimuthal plane, it is necessary to use at least three such PAAs 100A-100C. The necessity for three PAAs 100A-100C in a single radio unit increases the costs and complexity of that radio unit.

The present disclosure overcomes this problem by providing a dielectric waveguide body that is configured to redirect mmWave radio signals (i.e. radio signals having frequencies above about 24 GHz). When a dielectric waveguide body is placed in close proximity to a PAA 100, radio waves emitted by the PAA 100 can be redirected within the dielectric waveguide body, thereby transforming a beam 106 directed at an acute angle relative to the boresight direction 108 into radially directed beam, for example, which may be steered through 360° about the boresight direction 108.

For the purposes of the present disclosure, placing the dielectric waveguide body in close proximity to the PAA 100 means that dielectric waveguide body is positioned sufficiently close to the PAA 100 that most of the RF energy emitted (or received) by the PAA 100 will propagate through the dielectric waveguide body.

The example embodiments described herein make use of planar array antennas 100 as described above. However, the use of such planar array antennas is not essential. Based on the teachings herein, it will be apparent that other antenna types may be used in conjunction with a dielectric waveguide body to redirect mmWave radio signals and so obtain desired propagation characteristics.

Figure 3A:
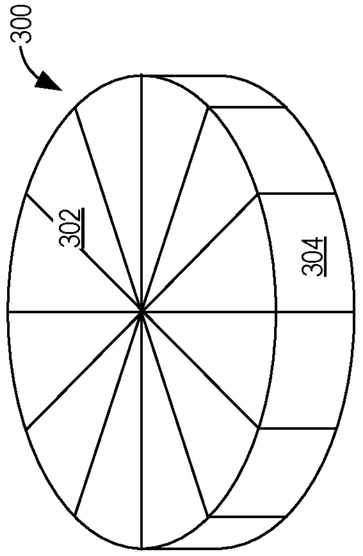
FIGS. 3A-3E illustrate embodiments of a dielectric waveguide body.
Figure 3B:
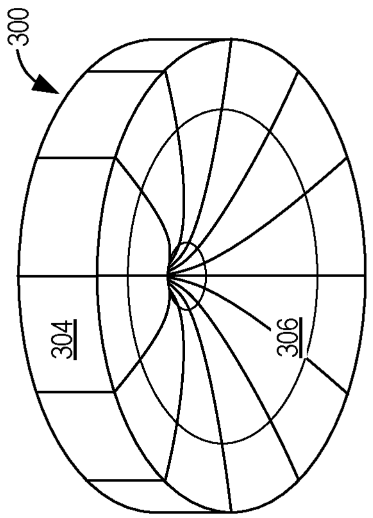
Figure 3C:
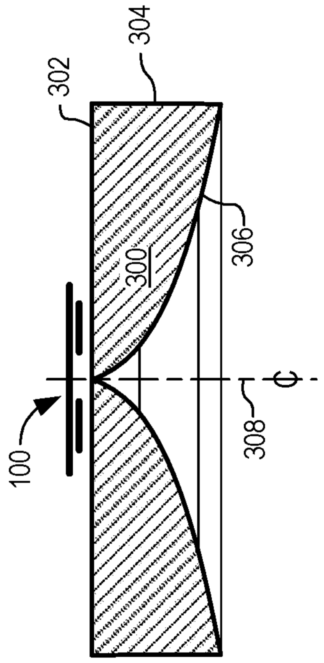

FIGS. 3A and 3B respectively illustrate upper and lower perspective views of an example dielectric waveguide body 300. As may be seen in FIGS. 3A and 3B, the example dielectric waveguide body 300 has a generally disc-like shape with a flat upper surface 302, a cylindrical perimeter surface 304 and a curved lower surface 306 defining an internal reflection surface. FIG. 3C shows a cross-sectional view of the dielectric waveguide body of FIGS. 3A and 3B, with the planar array antenna 100 positioned proximal (e.g. on or near) the upper surface 302 such that the antenna modules 102 are distributed about the central axis 308 of the dielectric waveguide body 300 and such that the dielectric waveguide body 300 receives the RF signals emitted by each of the antenna modules 102. This means that radio signals propagating to/from the antenna modules 102 must pass through the dielectric waveguide body 300 and may be reflected by the internal reflection surface 306 due primarily to the difference between the respective dielectric constants of the dielectric waveguide body 300 and the surrounding air. Example materials that may be suitable for use to form the dielectric waveguide body 300 include polytetrafluoroethylene (PTFE, e.g. Teflon©), Kapton©, and Polyethylene (such as Low Density Polyethylene (LDPE), or High Density Polyethylene (HDPE), for example).

In the illustrated examples, the upper surface 302 is comparatively flat. In other embodiments, the upper surface 302 may have a different shape, such as, stepped, concave or convex, for example. In broad terms, the upper surface 302 is configured to enable transmission of RF energy between the dielectric waveguide body 300 and the PAA 100, and may have any suitable shape for this purpose. In addition, the upper surface 302 may have bosses or other features (not shown) to facilitate mechanical mounting of the PAA 100 and the dielectric waveguide body 300.

In the illustrated examples, the outer surface 304 is a smoothly curved cylindrical surface. In other embodiments, the outer surface 304 may have a different shape, such as faceted (e.g. polygonal), rectangular, or elliptical, for example.

In some embodiments, the planar array antenna 100 is positioned such that its boresight 108 is at least approximately aligned with the central axis 308 of the dielectric waveguide body 300. In this respect, precise alignment between the boresight 108 and the body's central axis 308 is not essential because any small misalignment (due, for example, to manual positioning of the antenna array 100 on the upper surface 302 of the dielectric waveguide body 300) can be compensated by the beam steering circuitry and algorithms.

In some embodiments, the planar array antenna 100 is positioned such that the respective antenna modules 102 may be symmetrically distributed about the center axis 308 of the dielectric waveguide body. In such cases, beam steering can be accomplished by varying the signal power and/or amplitude supplied to each antenna module 102. In some embodiments, beam steering via changing the signal power supplied to each antenna module 102 may be combined with varying the signal phase supplied to each antenna module 102.

Figure 3D:
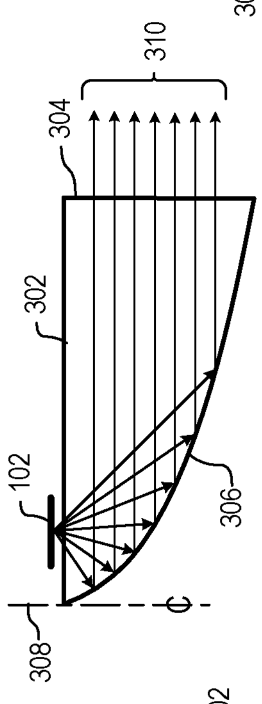

Geometrically, the dielectric waveguide body 300 may be considered as a 2-dimensional parabolic surface that is rotated about the body's central axis 308 to define the 3-dimensional shape of the dielectric waveguide body 300. As may be seen in FIG. 3D, the use of a parabolic or quasi-parabolic (i.e. a paraboloid) internal reflection surface 306 redirects mmWave radio signals propagating radially from an antenna module 102 located near a focus of the internal reflection surface 306 to form a radially directed beam 310 that exits the dielectric waveguide body 300 through the outer surface 304. Other reflection surface contours (e.g. circular, faceted, etc.) may be used to modify the internal reflection of radio waves within the dielectric waveguide body, and so obtain desired signal propagation characteristics. Similarly, different surface textures (eg. smooth, roughened, ribbed etc.) may be used to modify the internal reflection of radio waves within the dielectric waveguide body, as well as radio signal leakage through the internal reflection surface 306, and so obtain desired signal propagation characteristics.

Figure 3E:
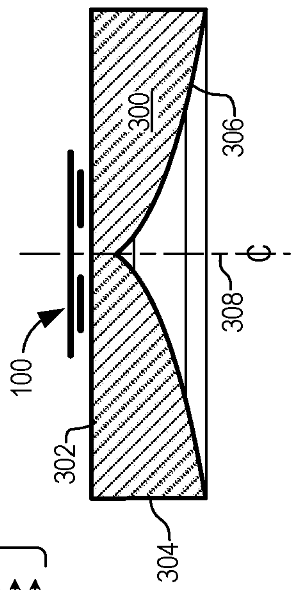

FIG. 3E illustrates another example dielectric waveguide body 300, in which the internal reflection surface 306 merges at the center of the dielectric waveguide body 300, resulting in a non-zero depth of the dielectric waveguide body 300 at that point.

Figure 4:
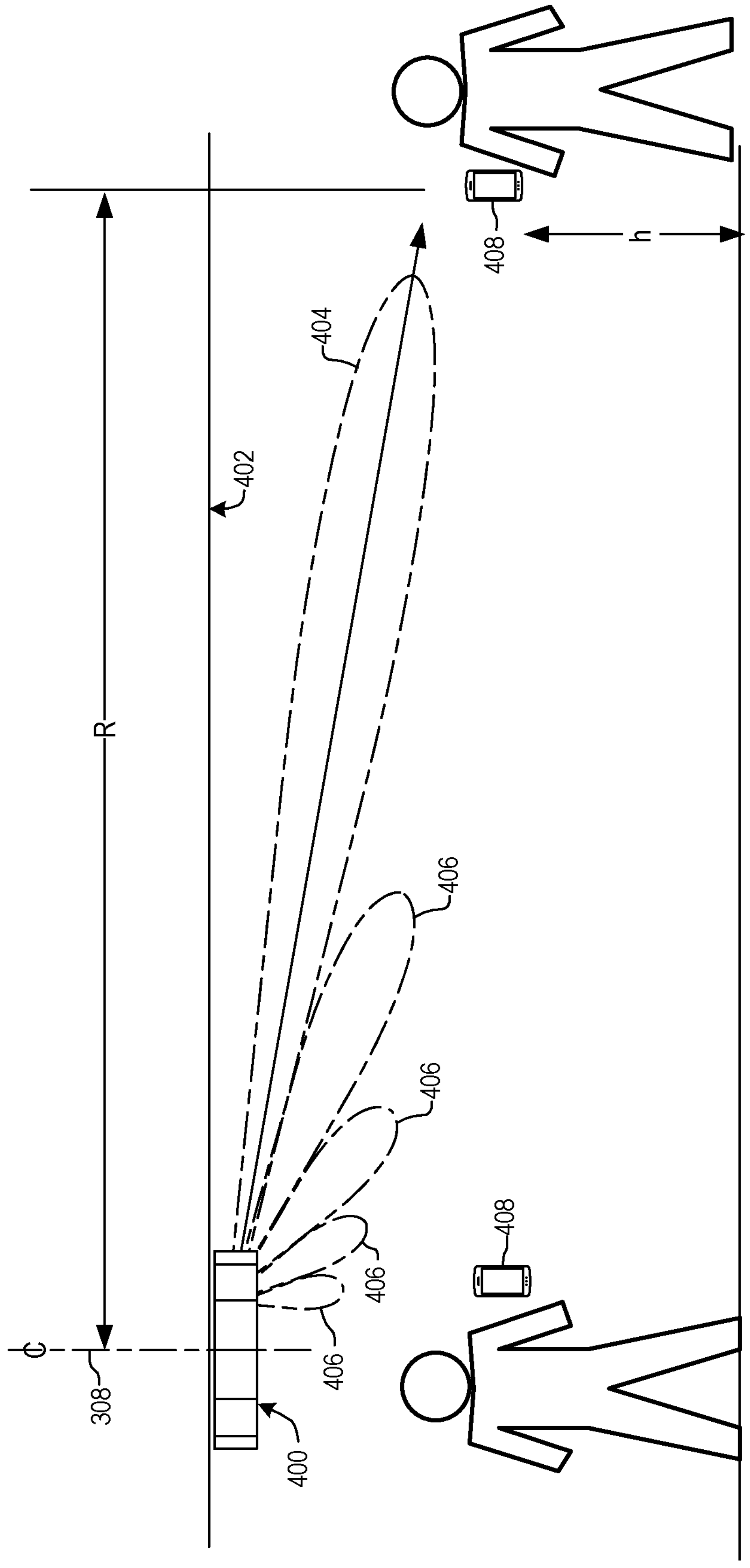
FIG. 4 illustrates example radio signal propagation associated with a radio unit including the dielectric waveguide body.

FIG. 4 illustrates an example radio unit 400 deployed in an in-door space. In the example of FIG. 4, the radio unit 400 is mounted on a ceiling 402, and the internal reflection surface 306 selected such that radio signals emitted by an antenna module 102 located near a focus of the internal reflection surface 306 are redirected to form a main beam 404 and a plurality of side-lobes 406 projecting at varying downward angles from the radio unit 400.

As may be seen in FIG. 4, the main beam 404 is directed radially relative to the central axis 308 of the dielectric waveguide body 300, and thus also the boresight direction of the PAA 100. In addition, the main beam 404 is directed at an angle to the central axis 308 so as to illuminate a UE 408 located at a selected height (h) at a predetermined radial distance (R) from the radio unit 400. The height (h) may be selected to correspond with a height at which a UE is expected to be carried within the coverage area of the radio unit 400. In some embodiments, the predetermined radial distance (R) may also define a nominal limit of the coverage area of the radio unit 400

The side-lobes 406 are primarily the result of signal leakage through the internal reflection surface 306, and may be affected by the specific shape of the internal reflection surface 306. In some embodiments, side-lobes 406 may be steerable via adjustment of one or more of the relative phase and amplitude of signals supplied to the antenna modules 102.

Figure 5A:
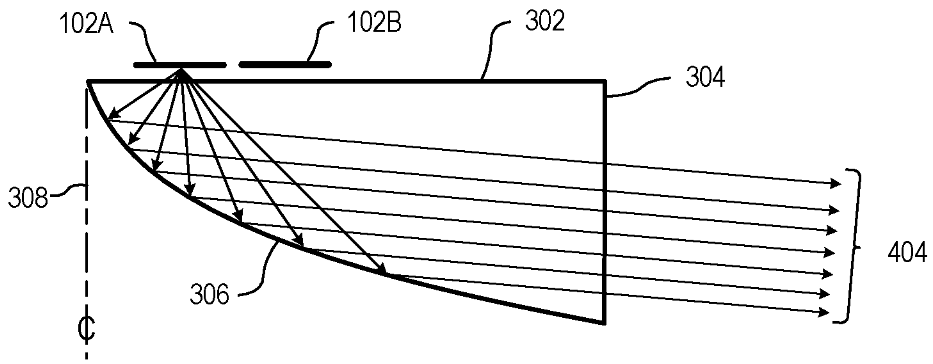
FIGS. 5A and 5B illustrate an example of independently steerable main beam and side lobes.
Figure 5B:
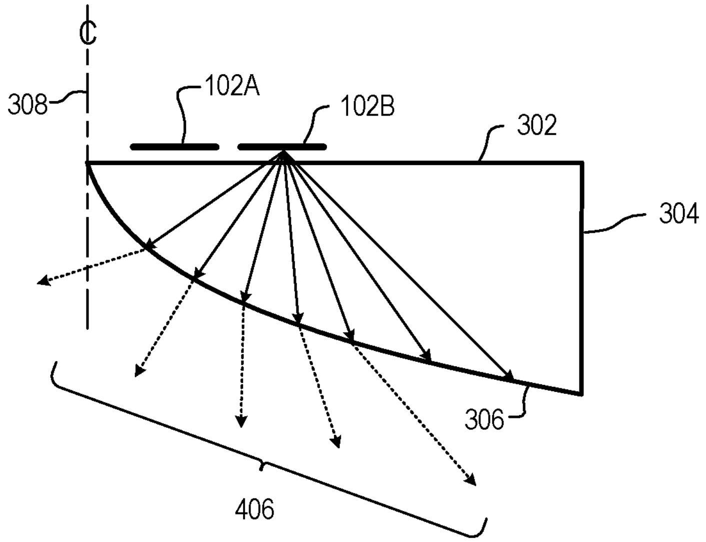

In some embodiments, at least some degree of steering of the side lobes 406 may be accomplished with minimal effect on the main beam 404, For example, FIGS. 5A and 5B illustrate an embodiment in which a first set of antenna modules 102A are located proximal (e.g. at or near) a focus of the paraboloidal internal reflection surface 306 and may be referred to as "focused", while a second set of antenna modules 102B are located distal the focus (e.g. further away from the central axis 308), and therefore may be referred to as "unfocused". In this case, most of the RF energy emitted by the "focused' antenna modules 102A will be redirected into the main beam 404 as may be seen in FIG. 5A, due to total (or near-total) internal reflection from the internal reflection surface 306. On the other hand, most of the RF energy emitted by the "unfocused' antenna modules 102B will leak through the internal reflection surface 306 and so appear in the side lobes 406, as may be seen in FIG. 5B. With this arrangement, varying the signal amplitude and/or relative phase of RF signals supplied to focused antenna modules 102A will tend to steer the main beam 404 while having relatively little impact on the side lobes 406. Conversely, varying the signal amplitude and/or relative phase of RF signals supplied to unfocused antenna modules 102B will tend to steer the side lobes 406 while having relatively little impact on the main beam 404.

The combination of a main beam 404 and multiple side lobes 406 is beneficial in that the main beam 404 can provide connectivity for a user equipment (UE) 408 located at a distance from the radio unit 400, while the side-lobes 406 can provide connectivity for UEs 408 that are closer to (and even directly under) the radio unit 400. This results in a substantially hemispherical coverage zone that is substantially free of dead areas and in which the radiated signal power naturally varies with distance from the radio unit 400. Consequently, the radio unit 400 is able to efficiently service UEs 408 located anywhere within the coverage zone swept by the main beam 404.

As may be appreciated, conventional mmWave radio units possessing an electronically steerable antenna can be easily modified by the addition of a dielectric waveguide body 300 to provide full 360° steerable coverage:

- the mmWave signal is steerable in dielectric waveguide;
- Dielectric (certain plastic materials, for example) work well at mmWave frequencies (such as 27 GHz, for example) as Waveguide;
- Dielectric waveguide forms a good radome, for redirecting radio signals from a vertical beam to a horizontal steerable beam;
- EIRP may be increased relative to a conventional PAA 100 due to concentrated beam forming resulting from paraboloidal shape of the dielectric waveguide body 300;
- 360° steerable coverage can be obtained using a single PAA 100 coupled to the dielectric waveguide body 300, thereby providing a low-cost alternative to conventional radio units that require multiple PAAs to obtain a similar steering range.

Building practice—PAA boresight 108 pointing "down", dielectric waveguide body redirects downward directed RF signals to form a radially propagating main beam 404, with hemispherical coverage provided by sidelobes 406;

- Paraboloidal curve shaped waveguide body clearly shows formed beam transforms to horizontal from vertical;
- Dielectric waveguide promotes sidelobes in concert with main horizontal beams;
- Steerability is possible in 360° about the dielectric waveguide, thereby enabling TDMA-omni hemispherical coverage Beam steering SW

- System level beam steering algorithms can find UE's empirically using CSI-RSRP, for example
- Adding a dielectric waveguide body 300 to redirect RF signals does not change this ability, but instead enables increased steering range and/or signal coverage.
- The sidelobes 406 may also be steerable with minimal impact on the main beam 404. As may be appreciated, there may be one or more nulls between the sidelobes 406 that could effectively have little or no transmission (or reception). A relatively fixed direction of the main beam 404 may be maintained for a given steering angle, while subtle changes in the relative phase and/or amplitudes of the signals feeding the various antenna elements 102 may beneficially impact the sidelobes 406 and any associated nulls and so have the effect of steering the sidelobes 406 to minimize the effect of the nulls with little impact on the power of the main beam 404.

Universality

- Dielectric waveguide body 300 can be adapted for use with any mmWave antenna, and used to provide a desired coverage pattern.
- Usable waveguide materials that are RF-transparent at mmWave frequencies may include polytetrafluoroethylene (PTFE, e.g. Teflon©), Kapton©, and Polyethylene (such as Low Density Polyethylene (LDPE), or High Density Polyethylene (HDPE).

Based on the foregoing description, it may be appreciated that aspects of the present disclosure provide:

- A dielectric waveguide body comprising an internal reflection surface configured to redirect mmWave radio signals propagating within the waveguide body such that radio signals emitted by an antenna module are redirected to generate a main beam and at least one sidelobe.

In some embodiments, the dielectric waveguide body is formed of any one of polytetrafluoroethylene (PTFE, e.g. Teflon©), Kapton©, and polyethylene.

In some embodiments, the antenna is a planar array antenna. In some embodiments, steering of the main beam is accomplished by controlling at least a radio signal power supplied to each antenna module of the planar array antenna. In some embodiments, steering of the main beam is accomplished by controlling at least a relative radio signal phase supplied to each antenna module of the planar array antenna.

In some embodiments, the internal reflection surface has a parabolic or quasi-parabolic shape.

In some embodiments, the internal reflection surface comprises a continuous curved shape.

In some embodiments, the internal reflection surface is faceted.

In some embodiments, the internal reflection surface is configured to generate the at least one sidelobe by leakage of radio signal energy through the internal reflection surface.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

The invention claimed is:

1. A dielectric waveguide body comprising:

an upper surface configured to receive mmWave radio signals emitted by one or more antenna modules of a radio unit;

a perimeter surface; and an internal reflection surface disposed opposite the upper surface and having a quasi-parabolic shape configured to redirect mmWave radio signals propagating within the waveguide body from the upper surface to generate a main beam and at least one sidelobe, the main beam being emitted from the dielectric waveguide body through the perimeter surface;

the internal reflection surface having a focus, and wherein radio signals emitted by an antenna module located proximal the focus are redirected to generate the main beam.

2. The dielectric waveguide body as claimed in claim 1, wherein the dielectric waveguide body is formed of any one of polytetrafluoroethylene (PTFE), Kapton©, and polyethylene.

3. The dielectric waveguide body as claimed in claim 1, wherein the internal reflection surface has a parabolic or quasi-parabolic shape.

4. The dielectric waveguide body as claimed in claim 1, wherein the internal reflection surface comprises a continuous curved shape.

5. The dielectric waveguide body as claimed in claim 1, wherein the internal reflection surface is faceted.

6. The dielectric waveguide body as claimed in claim 1, wherein the internal reflection surface is configured to generate the at least one sidelobe by leakage of radio signal energy through the internal reflection surface.

7. The dielectric waveguide body as claimed in claim 1, wherein the focus is located near the upper surface of the dielectric waveguide body.

8. The dielectric waveguide body as claimed in claim 1, wherein radio signals emitted by an antenna module located distal the focus are redirected to generate the at least one sidelobe.

9. A radio unit comprising:

one or more antenna modules configured to emit or receive mmWave radio signals; and a dielectric waveguide body comprising:

an upper surface disposed in relation to the one or more antenna modules such that the mmWave radio signals emitted or received by the one or more antenna modules pass through the dielectric waveguide body;

a perimeter surface; and an internal reflection surface disposed opposite the upper surface and having a quasi-parabolic shape configured to redirect mmWave radio signals propagating through the dielectric waveguide from the upper surface to form a main beam and one or more sidelobes, the main beam being emitted from the dielectric waveguide body through the perimeter surface;

wherein the one or more antenna modules comprise a plurality of antenna modules of a planar array antenna; and wherein a first set of antenna modules is positioned proximal a focus of the internal reflection surface, the first set comprising one or more of the plurality of antenna modules.

10. The radio unit as claimed in claim 9, wherein each antenna module comprises a pair of antenna elements, each antenna element being configured to emit or receive the mmWave radio signals.

11. The radio unit as claimed in claim 9, wherein the dielectric waveguide body is formed of any one of polytetrafluoroethylene (PTFE), Kapton©, and polyethylene.

12. The radio unit as claimed in claim 9, wherein at least a radio signal power supplied to each antenna module of the first set of antenna modules can be controlled to steer the main beam.

13. The radio unit as claimed in claim 9, wherein at least a relative radio signal phase supplied to each antenna module of the first set of antenna modules can be controlled to steer the main beam.

14. The radio unit as claimed in claim 9, wherein a second set of antenna modules is positioned distal a focus of the internal reflection surface, the second set comprising one or more of the plurality of antenna modules.

15. The radio unit as claimed in claim 14, wherein at least a radio signal power supplied to each antenna module of the second set of antenna modules can be controlled to steer the one or more sidelobes.

16. The radio unit as claimed in claim 14, wherein at least a relative radio signal phase supplied to each antenna module of the second set of antenna modules can be controlled to steer the one or more sidelobes.

* * * * *